(12) United States Patent
McCallum et al.

(10) Patent No.: US 6,266,954 B1
(45) Date of Patent: Jul. 31, 2001

(54) DOUBLE WALL BEARING CONE

(75) Inventors: Martel A. McCallum, Simpsonville; Jon A. Ebacher, Spartanburg, both of SC (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/464,052

(22) Filed: Dec. 15, 1999

(51) Int. Cl.$^7$ ....................................................... F02C 3/00
(52) U.S. Cl. .................. 60/39.75; 60/39.31; 60/39.36; 60/39.132; 60/261
(58) Field of Search ................. 60/39.75, 39.36, 60/39.132, 39.31, 261

(56) References Cited

U.S. PATENT DOCUMENTS 5,307,622 * 5/1994 Ciokajlo et al. .................. 60/39.162
6,067,792 * 5/2000 Tubbs .................................. 60/39.75

FOREIGN PATENT DOCUMENTS

1103638 * 3/1961 (DE) ..................................... 60/39.31

* cited by examiner

*Primary Examiner*—Charles G. Freay
*Assistant Examiner*—Eric D. Hayes
(74) *Attorney, Agent, or Firm*—Nixon & Vanderhye

(57) ABSTRACT

A double wall bearing cone closes an opening between a bearing housing and an exhaust frame in a gas turbine. The bearing cone includes a conical forward plate having an inner diameter and an outer diameter and a conical aft plate nested with and spaced from the conical forward plate. A hub connects the inner diameters of the forward plate and the aft plate. The hub preferably includes holes therein that serve to meter air flow between the forward plate and the aft plate. The double wall bearing cone defines a cooling circuit that reduces wear between a third stage turbine wheel in a gas turbine and the rotor aft shaft.

13 Claims, 4 Drawing Sheets

DOUBLE WALL BEARING CONE

BACKGROUND OF THE INVENTION

The invention relates to cooling in a gas turbine and, more particularly, to a double wall bearing cone that closes the opening between the bearing housing and the exhaust frame structure in a gas turbine.

A bearing cone is a barrier wall in a gas turbine that closes the opening between the bearing housing and the exhaust frame structure of the gas turbine. As shown in FIG. 1, this barrier wall 100 creates a cavity 102 around the rotor aft shaft 104 and the turbine third stage wheel 106 that is supplied with purge air to prevent leakage of hot turbine exhaust gas into the cavity 102. Normally, air discharging from the exhaust frame cooling circuit is used to pressurize and purge the rotor aft shaft cavity 102.

Problems resulting from wear have been noted in the turbine third stage wheel and rotor aft shaft rabbet joint due to adverse thermal gradients in the rotor created by the purge air conditions in the aft shaft cavity. Impingement of exhaust frame cooling air on the aft face of the third stage wheel and leakage of cold bearing tunnel air across the bearing cone into the rotor aft shaft cavity (see arrows in FIG. 1) are major contributors to the adverse thermal gradients.

BRIEF SUMMARY OF THE INVENTION

A cooling circuit modification is thus helpful to improve the thermal boundary conditions on the rotor aft shaft. In an exemplary embodiment of the invention, a bearing cone that closes an opening between a bearing housing and an exhaust frame in a gas turbine includes a conical forward plate having an inner diameter and an outer diameter. A conical aft plate is nested with and spaced from the conical forward plate and also includes an inner diameter and an outer diameter. A hub connects the inner diameters of the forward plate and the aft plate. The hub is preferably provided with holes therein that serve to meter air flow between the forward plate and the aft plate. The forward and aft plates are connected to forward and aft supporting plates at the respective outer diameters. Gusset plates may also be provided, connecting the forward and aft supporting plates.

In another exemplary embodiment of the invention, an exhaust frame cooling circuit in a bearing housing of a gas turbine is defined by cooling air flow through the bearing cone of the invention. The cooling circuit includes an air flow path between the forward plate and the aft plate of the bearing cone.

In still another exemplary embodiment of the invention, a gas turbine includes a bearing housing supporting a turbine wheel, and an exhaust frame receiving hot combustion gas and including a cooling circuit. The bearing cone of the invention is disposed in an opening between the bearing housing and the exhaust frame. The exhaust frame may include a slot receiving the bearing cone aft supporting plate, wherein a rope packing seal is disposed between the bearing cone aft supporting plate and the slot. The hub is preferably engaged with the bearing housing via a wave seal. The conical forward plate of the bearing cone is engaged with an inner barrel ID of the exhaust frame via a floating split ring seal.

DETAILED DESCRIPTION OF THE INVENTION

Figure 1:
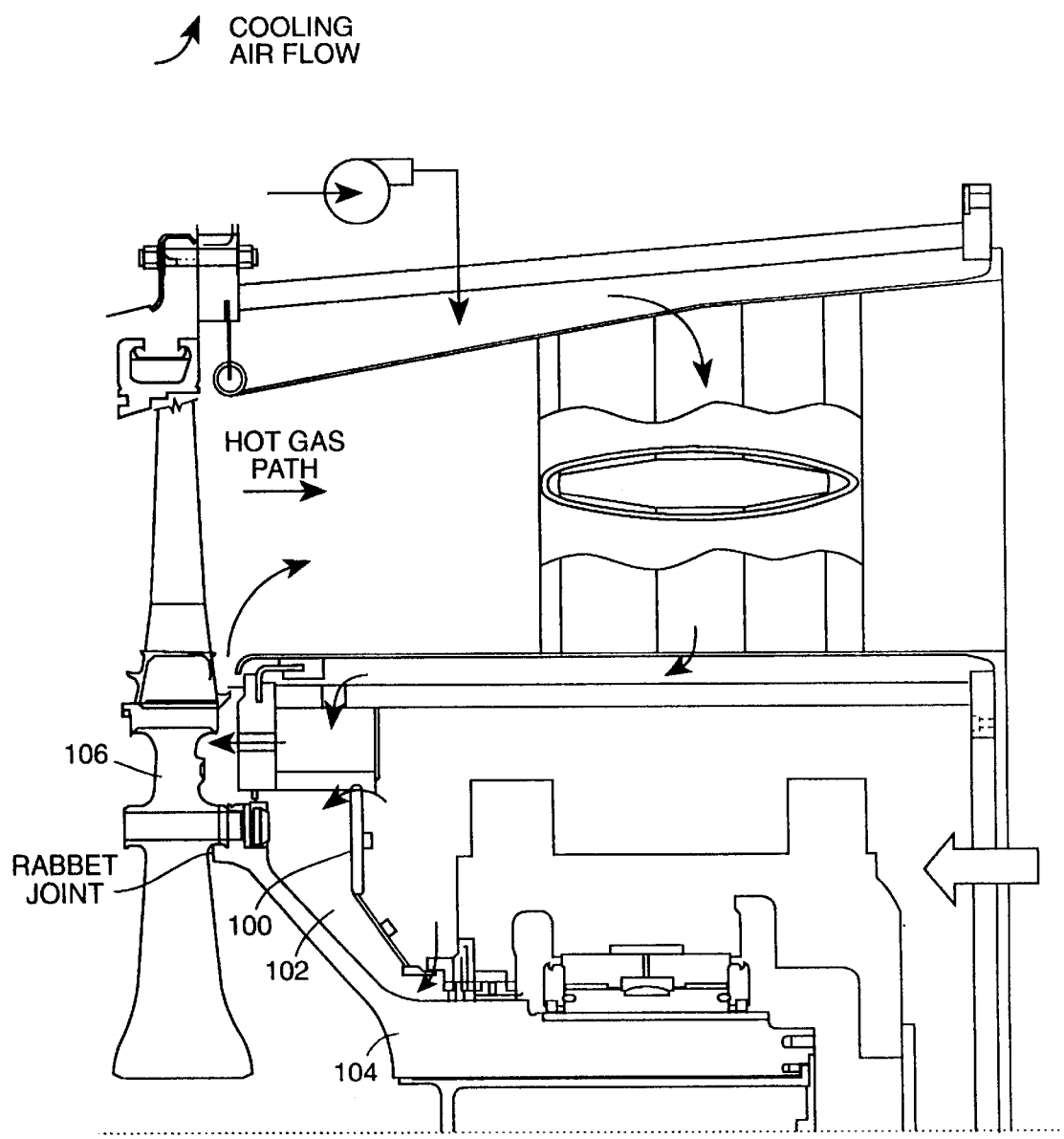
FIG. 1 is a cross sectional view of a conventional gas turbine illustrating a bearing cone and cooling circuit.
Figure 2:
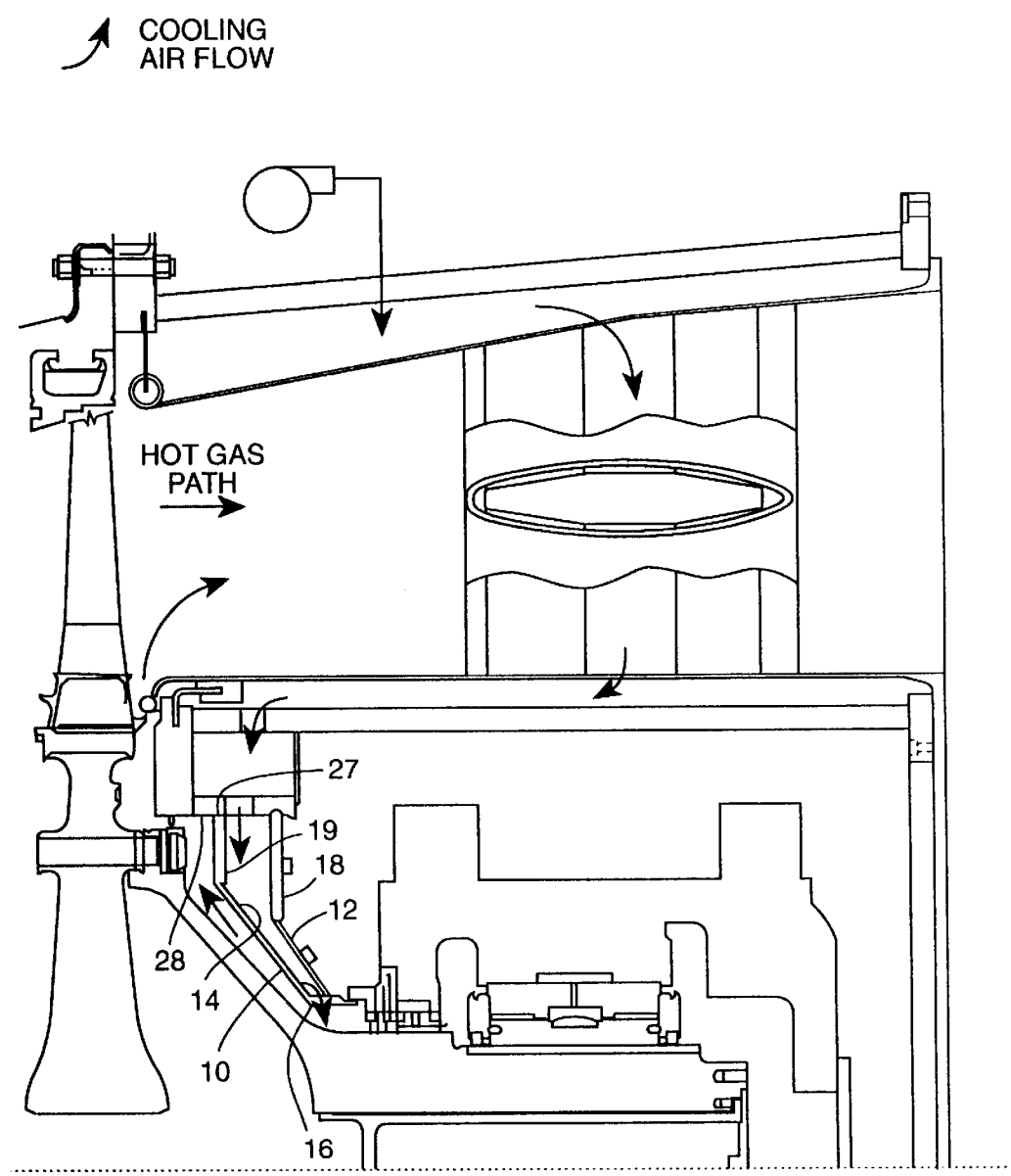
FIG. 2 is a cross sectional view of a gas turbine illustrating the double wall bearing cone of the present invention.
Figure 3:
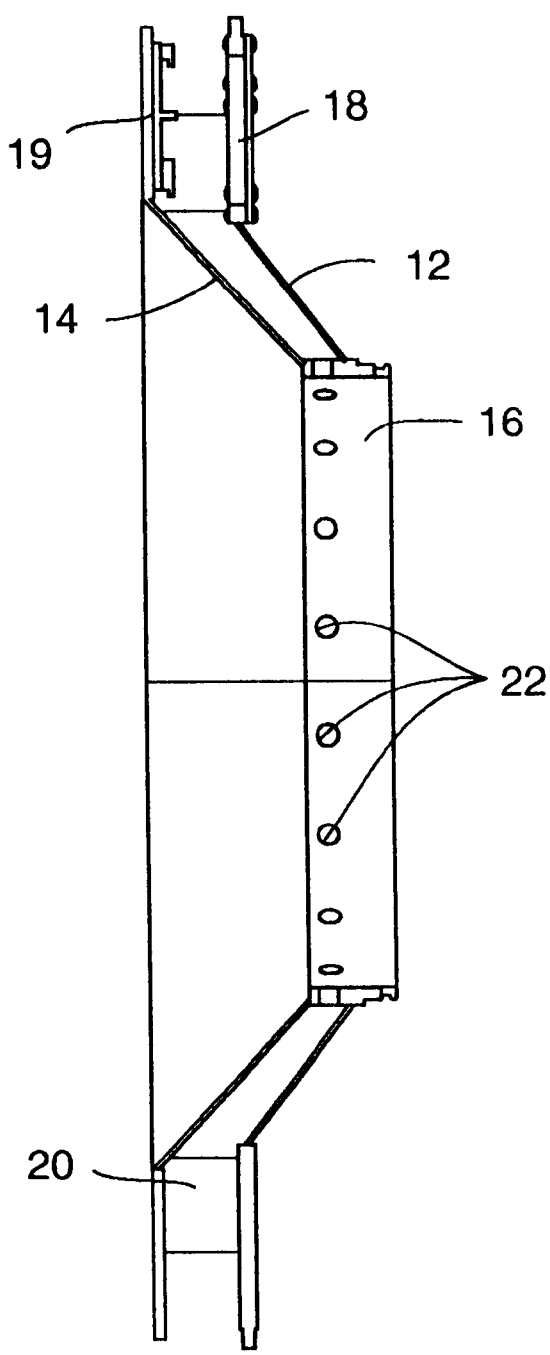
FIG. 3 illustrates the double wall bearing cone construction.
Figure 4:
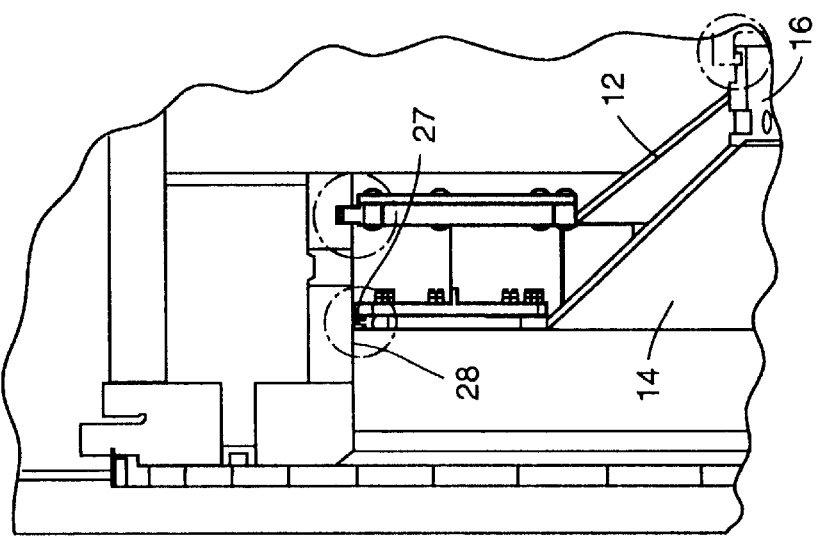
FIG. 4 shows the interface seals of the bearing cone of the invention.

Referring to FIGS. 2–4, the double wall bearing cone 10 of the invention is constructed of two nested and spaced conical plates, an aft plate 12 and a forward plate 14. The plates 12, 14 are connected by a single hub 16 at the respective inner diameters of the plates 12, 14.

The nested conical plates 12, 14 are connected to respective aft and forward supporting plates 18, 19 at their outer diameters. Gusset plates 20 connect the aft and forward supporting plates 18, 19 to minimize stress from pressure loading.

As shown in FIG. 3, the hub 16 is provided with holes 22 therein that are sized to meter the air flow to the rotor aft shaft cavity.

Figure 5:
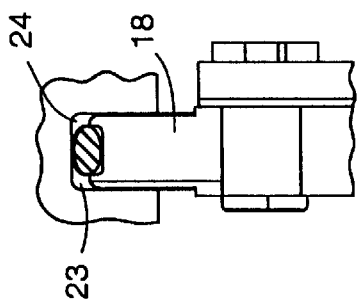
FIG. 5 is a close up view of the rope seal shown in FIG. 4.

Referring to FIGS. 4 and 5, the outer diameter of the bearing cone aft supporting plate 18 interfaces with a slot 23 in the exhaust frame, which is the same slot that supports the conventional bearing cone arrangement. Axial clearance at this slot interface has been reduced, and a rope packing seal 24 (FIG. 5) or other suitable seal is disposed between the bearing cone aft supporting plate 18 and the slot.

Figure 6:
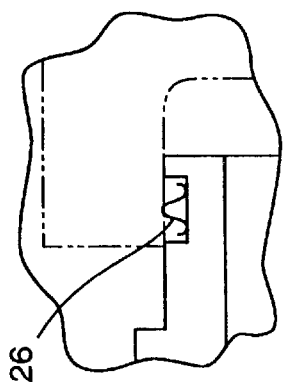
FIG. 6 is a close up view of the wave seal shown in FIG. 4.

At the hub 16 interface with the bearing housing, radial clearance has been minimized, and a metallic seal 26 (FIG. 6), such as a Wave Seal™ available from EG&G Aerospace and Engineered Products Division of Beltsville, Md., is disposed between the bearing housing and the hub 16. The EG&G Wave Seal™ is preferred because of its ability to accommodate relative motion, although other seals may also be suitable.

Figure 7:
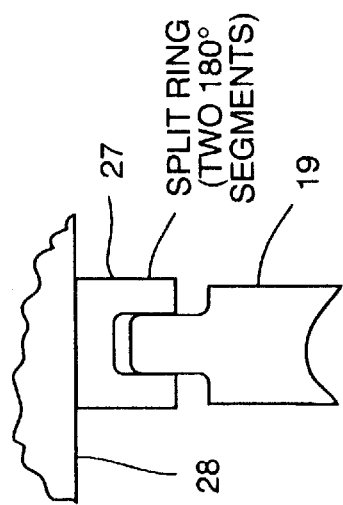
FIG. 7 is a close up view of the split ring seal shown in FIG. 4.

The forward supporting plate 19 of the double wall bearing cone uses a floating split ring seal 27 (FIG. 7) to interface with the exhaust frame inner barrel inner diameter (ID) 28. Although other seals may be suitable, the split ring seal allows a relatively tight fit while accommodating the non-concentricity of the bearing housing relative to the exhaust frame. The split ring seal also allows the double-wall bearing cone of the invention to be installed in an existing exhaust frame without the need for machining a second interface slot.

With the arrangement of the present invention, the double wall bearing cone provides sealing against bearing tunnel air leakage into the rotor aft shaft cavity at the exhaust frame interface by providing a positive air pressure relative to the bearing tunnel air. With the pressurized air from the exhaust frame cooling circuit flowing within the double wall bearing cone, any air leakage at the bearing cone to exhaust frame interface will be into the bearing tunnel, rather than the colder bearing tunnel air leaking into the rotor aft shaft cavity. Additionally, exhaust frame cooling air is redirected to eliminate the impingement on the aft face of the turbine third stage wheel and to introduce the purge air at the ID of the rotor aft shaft cavity in order to create a more deterministic set of flow and thermal boundary conditions through the aft shaft cavity. The metering holes in the hub reduce the total air flow through the exhaust frame and result in additional temperature pick up, which is beneficial for the rotor aft shaft thermal response.

As shown in FIG. 2, a cooling circuit is thus defined with cooling air flow across the hot combustion gas in the exhaust frame, between the forward plate and the aft plate of the bearing cone, and through the holes in the hub. The bearing cone provides a positive pressure against leakage of bearing tunnel air into the rotor aft shaft cavity. With the double wall bearing cone of the invention, the air temperature of the rotor aft shaft cavity is higher by approximately 100° F., thereby eliminating the rabbet diameter opening that produced the wear pattern observed between the third stage turbine wheel and the rotor aft shaft.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A bearing cone that closes an opening between a bearing housing and an exhaust frame in a gas turbine, the bearing cone comprising:

a conical forward plate having an inner diameter and an outer diameter;

a conical aft plate nested with and spaced from the conical forward plate and having an inner diameter and an outer diameter; and a hub connecting the inner diameters of the forward plate and the aft plate.

2. A bearing cone according to claim 1, wherein the hub comprises holes therein that serve to meter airflow between the forward plate and the aft plate.

3. A bearing cone according to claim 1, wherein the forward plate and the aft plate are connected to forward and aft supporting plates at the respective outer diameters.

4. A bearing cone according to claim 3, further comprising gusset plates connecting the forward and aft supporting plates.

5. An exhaust frame cooling circuit in a bearing housing of a gas turbine, the cooling circuit being defined by cooling air flow through a bearing cone including a conical forward plate having an inner diameter and an outer diameter, a conical aft plate nested with and spaced from the conical forward plate and having an inner diameter and an outer diameter, and a hub connecting the inner diameters of the forward plate and the aft plate, wherein the cooling circuit comprises an air flow path between the forward plate and the aft plate of the bearing cone.

6. An exhaust frame cooling circuit according to claim 5, wherein the hub includes holes therein that serve to meter airflow between the forward plate and the aft plate, and wherein the air flow path extends through the holes in the hub.

7. A gas turbine comprising:

a bearing housing supporting a turbine wheel;

an exhaust frame receiving hot combustion gas and including a cooling circuit; and a bearing cone disposed in an opening between the bearing housing and the exhaust frame, the bearing cone including a conical forward plate having an inner diameter and an outer diameter, a conical aft plate nested with and spaced from the conical forward plate and having an inner diameter and an outer diameter, and a hub connecting the inner diameters of the forward plate and the aft plate.

8. A gas turbine according to claim 7, wherein the forward plate and the aft plate are connected to forward and aft supporting plates at the respective outer diameters.

9. A gas turbine according to claim 8, wherein the exhaust frame comprises a slot receiving the bearing cone aft supporting plate, and wherein a rope packing seal is disposed between the bearing cone aft supporting plate and the slot.

10. A gas turbine according to claim 7, wherein the hub is engaged with the bearing housing, and wherein a metallic seal is disposed between the bearing housing and the hub.

11. A gas turbine according to claim 7, wherein the conical forward plate of the bearing cone is engaged with an inner barrel ID of the exhaust frame, and wherein a floating split ring seal is disposed between the conical forward plate and the inner barrel ID.

12. A gas turbine according to claim 7, wherein the hub comprises holes therein that serve to meter airflow between the forward plate and the aft plate.

13. A gas turbine according to claim 12, wherein the cooling circuit is defined by cooling airflow across the hot combustion gas in the exhaust frame, between the forward plate and the aft plate of the bearing cone, and through the holes in the hub.

\* \* \* \* \*